Nov. 3, 1959 S. B. WEINBERG ET AL 2,911,474

TELEPHONE ALARM SYSTEM

Filed Nov. 1, 1957

INVENTORS S. B. WEINBERG
O. H. WILLIFORD

BY John E. Cassidy
ATTORNEY

United States Patent Office 2,911,474
Patented Nov. 3, 1959

2,911,474

TELEPHONE ALARM SYSTEM

Seymour B. Weinberg, Massapequa, and Oscar H. Williford, Bronxville, N.Y., assignors to Bell Telephone Laboratories, Incorporated, New York, N.Y., a corporation of New York Application November 1, 1957, Serial No. 693,915
10 Claims. (Cl. 179—5)

Figures 1, 2:
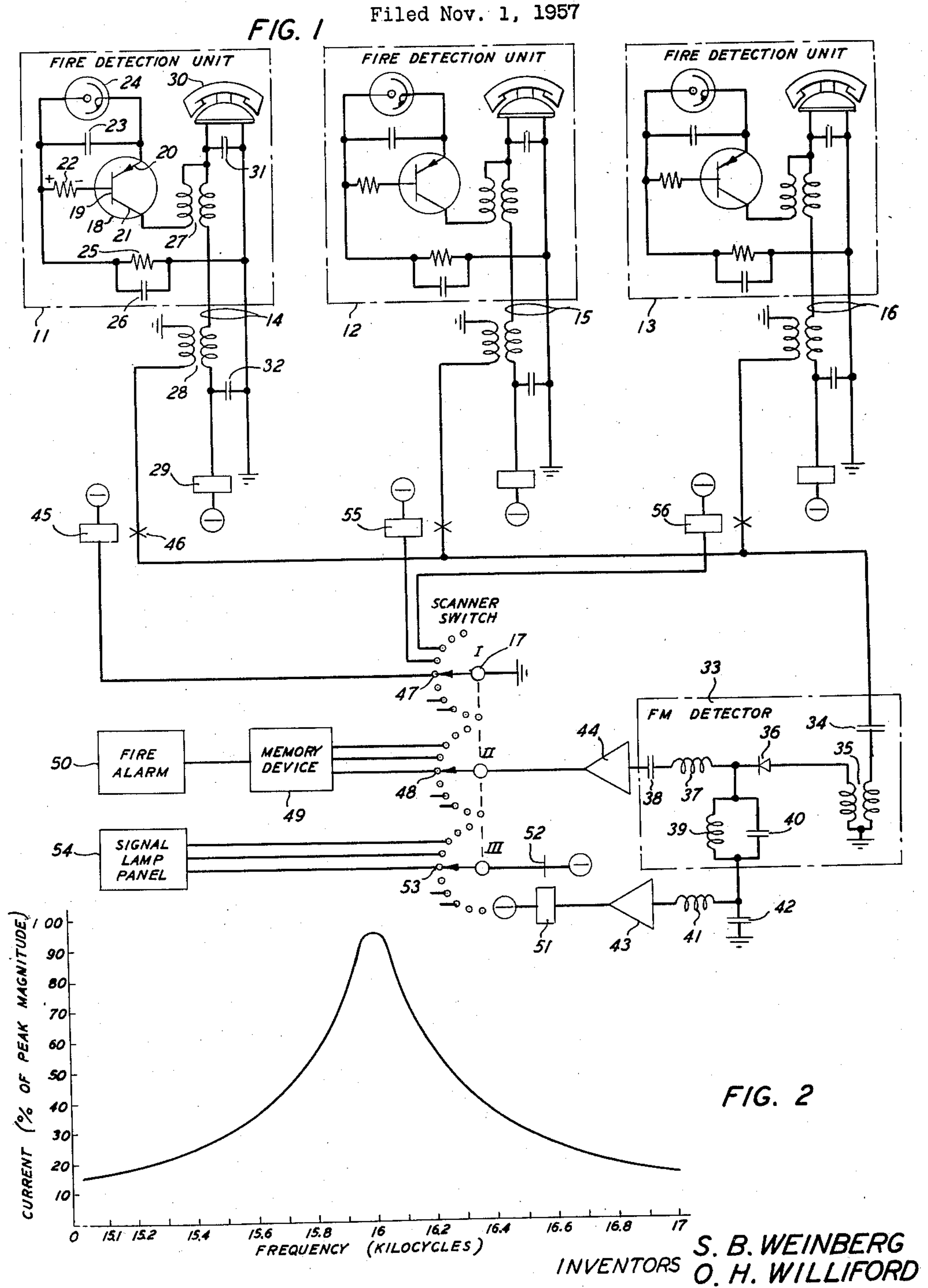

This invention relates to signaling systems and more particularly to systems used to furnish an alarm indicating the presence of an abnormal condition such as that presented by a fire or burglary.

Hotels, hospitals, and other buildings of that nature often require alarm systems in order to indicate conditions which may exist in remote rooms or areas of the buildings. For maximum protection the detecting apparatus should be located in each room or area to be kept under surveillance, and in order to efficiently operate such a system, a central monitor point is advantageous. Such a monitor point permits the use of a single human observer or general alarm and at the same time makes possible the use of common alarm circuitry rather than requiring the location of individual alarms in each area of surveillance. The physical layout of telephone systems is often ideally suited with respect to the features above mentioned. Telephone substations or sets are frequently located in each room of a hotel, for instance, and they are all connected to a common switchboard at which an operator is generally in continuous attendance.

Accordingly, it is an object of the present invention to provide an alarm system which may be utilized in hospitals, hotels, and other buildings or areas having a plurality of compartments or rooms requiring protection.

Particularly, an object of the present invention is to provide a fire and burglar detection system operable in conjunction with telephone equipment.

Another object of the present invention is the provision of an alarm system which is reliable and efficient and requires a minimum of installation and wiring changes in the event a telephone system is already present.

The prior art displays several arrangements wherein such detection systems are related to telephone equipment. Among these are some which operate to open a circuit when a fire is present, others which operate only when the local telephone is not in use, and still others which disturb conversations which are in process in order to give an alarm.

It is another object of the present invention to provide a system that operates in conjunction with existing telephone equipment and yet in no way interferes with normal telephone service.

Among the advantageous qualities a detection system should possess are that: (1) as aforementioned, it does not interfere with other systems; (2) it has a low power consumption; and (3) it has a long and dependable life. These qualities are present in this invention and are made possible by the features hereinafter disclosed.

A feature of the present invention is the employment of a signaling frequency outside of the frequency range detectable by ordinary telephone equipment.

Another feature of the present invention is the provision of a transistor oscillator for producing a non-interfering frequency, which oscillator is powered over the telephone lines and is capable of being modulated in the event of the occurrence of particular abnormal conditions.

Another feature of the present invention, as depicted in the following illustrative embodiment, is the utilization of a lead sulphide photoconductive cell to modulate the non-interfering frequency in the event of fire.

Yet another feature of the present invention is the provision of resonant circuit means for detecting the presence of frequency modulation upon the non-interfering frequency aforementioned and converting it to amplitude modulation.

In order to receive complete reliability from a system, it is required that the system be active rather than passive; that is, that it be continuously in operation, giving evidence of abnormal conditions by operating in a different manner than it does normally. A passive circuit is one which under normal conditions emits no signals whatever, being activated only when abnormal conditions exist, and clearly, there is no automatic way of investigating such a passive circuit.

Another feature of the present invention is the periodic scanning of each continuously operating detecting unit in order to determine whether or not it is functioning properly.

Yet another feature of this invention is the provision of a memory device operative to insure against false operation. Experience has indicated that it is not uncommon when such fire detection equipment is present in hotel rooms that the occupants thereof occasionally attempt to test their operation by holding matches in close proximity thereto. The provision of this memory feature makes necessary the passage of a predetermined amount of time during which a fire condition must be present before an alarm is given.

Fundamentally, this invention comprises a plurality of detection units located at strategic points throughout an area and associated with individual telephone substations. These units may be energized by a source located at the local switchboard to which the telephones are connected. An oscillator in each unit produces a frequency outside of the frequency range of the telephone equipment, which is modulated upon the occurrence of an abnormal condition. Periodically, equipment is connected to each substation line to ascertain its condition, yielding an indication of whether or not modulation is present. In the event that modulation is present for a predetermined period of time, a signal will be given warning the operator of such condition. Should no signal be present at all, a different signal will indicate failure of the detection equipment.

The foregoing, as well as additional objects and features, will be more clearly understood and appreciated from the following description to be considered in connection with the drawings wherein:

Fig. 1 is a circuit schematic of the detection system of the present invention when used for fire detection in conjunction with telephone equipment; and Fig. 2 is an illustration of a representative resonance curve such as might exist in the frequency modulation detector circuit used in this invention.

The following illustrative embodiment describes the utilization of this invention as a fire detection system operated in conjunction with telephone equipment. It will be understood by those familiar with the art that this invention is also applicable to burglary detection and that it may also be used, with minor modifications, in conjunction with power lines or as an independent system. In order to employ the present invention as a burglary detection arrangement, for example, it would be merely necesary to substitute a variable resistance device for the photoconductive cell described hereinafter, which device would be operative to modulate a standard frequency upon occurrence of such conditions as a door or window opening, a cord being tripped, etc.

Considering Fig. 1 it will be seen that three representative detection units 11, 12, and 13 are therein depicted. Each of these units is connected to an individual telephone line 14, 15, or 16 respectively and is connectable via a scaning switch 17 with a frequency modulation detection circuit 33. Each detection unit is comprised of a negative resistance transistor oscillator controlled by a photoconductive cell. This cell may be of the lead sulphide variety or any other having the property of varying impedance in the presence of infra-red rays. The oscillators are tuned to a frequency above the responsive range of normal telephone equipment. For the purposes of this illustration we shall assume that this frequency is 16 kc. (kilocycles per second) and that in the presence of infra-red radiation due to the varying impedance of the lead sulphide cell, a frequency variation of ±1 kc. will be experienced. In the event of a fire, the flicker of the flame changes the intensity of the infra-red rays at a particular rate, which may be between 10 to 50 times per second, causing a shifting of the normal detector frequency at that flicker rate. This effectively produces an FM (frequency-modulated) wave. The presence of this modulation is detected by frequency modulation detector circuit 33 and its occurrence registered in memory device 49. If such modulation persists on successive connections of the frequency modulation detector to a particular telephone line, an alarm will be given.

In order to describe this invention more specifically, consider the operation of the illustrative embodiment with respect to detection unit 11 which is developed around transistor 18, having base 19, emitter 20, and collector 21. Transistor 18 is connected as a negative resistance oscillator utilizing base resistor 22, capacitor 23, and photoconductive cell 24. The oscillator is energized by negative battery applied through line relay 29, primary of transformer 28, secondary and primary of transformer 27, to collector 21. Electron current flowing through transistor 18 from collector 21 to base 19 finds ground via resistor 22, and resistor 25 and capacitor 26 in parallel. This electron current develops a voltage drop across resistor 22 in the polarity shown, i.e., negative at base 19, which is effective to cause current flow in the emitter circuit charging capacitor 23.

The charge on capacitor 23 increases until the negative bias created by it and impressed upon emitter 20 is sufficient to drive transistor 18 into its cut-off region. Capacitor 23 then discharges through photoconductive cell 24 at a rate determined by the resistance thereof which is a value permitting the 16 kc. oscillatory rate hereinbefore assumed. Clearly, as capacitor 23 discharges, the bias on emitter 20 becomes less negative until the operation of transistor 18 is at the point of transition between cut-off and the negative resistance region. At this point, the values of the internal resistance of emitter 20 and collector 21 drop quickly to zero and the current is limited only by the impedance of the collector load. The emitter and collector current again increase recharging capacitor 23, and the above-described cycle of operation continues.

In the presence of infra-red rays the impedance of cell 24 varies, becoming less as the intensity of the rays increases. Because the oscillatory rate of the circuit depends upon the discharge rate of capacitor 23, it follows that the infra-red rays produced by a fire will cause the oscillator to operate at a higher frequency. The signal produced in the oscillating circuit is induced in the secondary of transformer 27 and conducted over telephone line 14 to the primary of transformer 28.

Before proceeding further it will be advantageous to consider the functioning of scanner switch 17. This switch is depicted as a rotary switch having three banks of contacts, I, II, and III; however, it will be understood that this is merely an illustration and that other switching means may be employed. The contacts of bank I are used to connect ground to individual relays associated with each detection unit. Representative relays are shown as 45, 55, and 56. Operation of these relays is effective to connect the associated fire detection unit to FM (frequency modulation) detector 33 where the signal produced thereby is analyzed. Contact bank II connects FM detector 33 to memory device 49 which comprises a plurality of elements each representative of a particular detection unit. This memory device may employ flip-flop circuits, magnetic cores, etc. to provide a means of requiring a plurality of inputs from any one detection unit before supplying an output to alarm 50. Contact bank III connects a voltage to lamp panel 54 under control of FM detector 33 in order to light a lamp individual to each detection unit in the event that the oscillator in that unit ceases to produce signals. Scanning switch 17 may be made continuously stepping in order to insure uninterrupted surveillance of all detection units within a particular period of time.

When detection unit 11 is being scanned, contact bank I connects battery through relay 45 and contact 47 to ground. Relay 45 is thereby energized causing closure of contacts 46 and providing a circuit to FM detector 33 extending from ground through the secondary winding of transformer 28. Experience has shown that relay 45 may advantageously be of the reed type to gain rapid and efficient response; however, there is no need to restrict the invention to such a relay. Assuming correct operation of detection unit 11, the frequency produced will be induced in the secondary of transformer 28 and transmitted to FM detector 33. Recall, that normally this frequency is 16 kc. and the presence of a fire will cause variations of ±1 kc.

FM detector 33 is primarily composed of three tuned resonant circuits. Capacitor 34 and transformer 35 are tuned to resonate at 16 kc.; capacitor 38 in series with inductance 37 is tuned to resonate at 30 c.p.s.; and capacitor 40 in parallel with inductance 39 is also tuned to resonate at 30 c.p.s. In a fashion familiar to those skilled in the art, the series resonant circuit may be tuned to present a low impedance at 30 c.p.s. and have half power points at 10 and 50 c.p.s.; similarly, the tank or parallel resonant circuit may be tuned to offer a low impedance for frequencies below 10 c.p.s. and above 50 c.p.s.

The type of resonance curve presented by capacitor 34 in series with transformer 35 is shown in Fig. 2. It will be noted that resonance occurs at 16 kc. and that a variation in frequency of ±1 kc. will result in a current magnitude approximately 17 percent of the maxium value. The particular resonance curve shown illustrates a Q (quality factor) of 50, but it will be clear from the following discussion that any high Q circuit would suffice.

When a signal of constant frequency, such as the assumed 16 kc. signal, is connected to FM detector 33, the impedance presented thereby is constant and therefore the current induced in the secondary of transformer 35 is of constant amplitude as well as having a constant 16 kc. frequency. However, when the signal frequency varies at a flicker rate of 10 to 50 c.p.s., indicative of infra-red radiation produced by a flame, the impedance presented by the FM detector will also vary, Fig. 2 indicating a variation of down to 17 percent of the maximum current for a variation of ±1 kc. Thus, when a frequency modulated signal is introduced to the FM detector, a current is induced in the secondary of transformer 35 which not only varies ±1 kc. in frequency but also in amplitude. The signal appears for all practical purposes to the following filters as an AM (amplitude modulated) wave.

The current induced in the secondary of transformer 35 is rectified by diode 36 and is then passed by either the series or parallel resonant paths to control either memory device 49 or lamp panel 54. When no modulation is present on the 16 kc. carrier frequency it is passed by the tank circuit 39, 40, smoothed by filter capacitor 42 and choke 41, amplified by direct-current amplifier 43, and operative to supply an energizing path for relay 51. The position of scanner switch 17 is such that contacts 53 in contact bank III apply a voltage via normally closed contacts 52 to a lamp in lamp panel 54 individually representative of detection unit 11. Operation of relay 51 breaks this circuit by opening contacts 52. By surveying lamp panel 54 it is possible to ascertain whether all detection units are functioning or which are faulty, if any, because if no carrier frequency is detected from a particular unit, relay 51 will not be operated and the representative lamp will be lit.

The wave present after rectification by rectifier 36 when a fire is present in the area surveyed by detection unit 11 will be amplitude modulated at the flicker rate of 10 to 50 c.p.s. and frequency modulated ±1 kc. The 10 to 50 c.p.s. modulation will be blocked by tank circuit 39, 40 and passed by series resonant circuit 37, 38, to amplifier 44, and thence through contacts 48 is contact bank II to memory device 49 where its occurrence is registered. Meanwhile, the varying 16 kc. carrier frequency is blocked by series resonant circuit 37, 38 and passed by tank circuit 39, 40 to energize relay 51, thereby keeping the lamp representative of detection unit 11 unlighted. These operations completed, scanner switch 17 steps to the next detection unit and so continues surveillance of the entire area.

The next time the scanner switch connects detection unit 11 to FM detector 33, if a fire condition still exists, the above conversion and filtering will again take place, and again memory device 49 will receive an input signal. This time, however, an output is produced designed to operate alarm 50 which in turn warns of the fire and its location. Should no modulated signal appear, memory device 49 will be reset. Operation of the alarm in this manner assures that infra-red rays have been impinging upon the detection unit for a particular period of time.

In order to permit operation of this circuit when the telephone receiver is off the hook, capacitors 31 and 32 have been added to the telephone line. These capacitors provide a path for the 16 kc. carrier and yet will not interfere with the normal telephone transmission. Resistor 25 and capacitor 26 have been added in the detection circuit to limit the current drawn thereby and to limit the current to the transistor when there is 20-cycle ringing on the line.

The other detecting units of this device represented by 12 and 13 operate in an identical fashion to that hereinbefore described, the only circuit difference being the contacts closed by scanner switch 17.

The above description serves merely to illustrate the principles involved in the present invention and as utilized in a particular embodiment. It is understood that numerous changes may be made by those skilled in the art without departing from the spirit and teaching of this invention and for that reason, there is no intention of limiting it to the embodiment hereinbefore illustrated.

What is claimed is:

1. A detection system comprising a source of frequency, means for modulating said frequency in response to a predetermined condition, detection means connectable to said source of frequency, signal means controlled by said detection means and operative in the absence of said frequency, and alarm means controlled by said detection means and operative when said frequency is modulated.

2. A detection system comprising a plurality of individual sources of frequency, means for modulating each individual frequency in response to a particular condition, detection means operative to detect the presence of said frequency and the presence of modulation thereon, connecting means for cyclically connecting said detection means with each of said sources of frequency, normally energized signal means controlled by said detection means and deenergized when said frequency is present at a connected source, and additional signal means controlled by said detection means and operative when the frequency present at a connected source is modulated.

3. A detection system having a plurality of detecting units located throughout an area, lines connecting each of said detecting units to a switching center, an oscillator in each of said detecting units generating a predetermined frequency for transmission over the particular line associated with each unit, modulating means in each of said oscillators for modulating the frequency thereof in response to a predetermined condition, circuit means at said switching center for detecting the presence of modulation on said frequency, switch means at said switching center operable to selectively connect said circuit means to each of said lines, a plurality of signal means individually representative of a particular detecting unit responsive to the detection of said predetermined frequency by said circuit means, memory means operable in response to the detection of modulation on said frequency, and alarm means controlled by said memory means and operated when said circuit means detects modulation on a particular line on several successive connections thereto.

4. A detection system as defined in claim 3 wherein said circuit means comprises, a first resonant circuit tuned for minimum impedance at said predetermined frequency, a second resonant circuit tuned to pass the modulation components impressed on said frequency by said modulating means, a third resonant circuit tuned to pass said predetermined frequency, and means for inductively coupling said first with said second and said third resonant circuits.

5. In combination with a telephone system having a subscriber telephone set and line, a source of frequency energized over said line and inaudible through said telephone set, means for modulating said frequency in response to a particular condition, detection means operative to detect the presence of said frequency and the presence of modulation thereon, switching means controlled by said detection means and operative when said frequency is present, first signal means controlled by the operation of said switching means operative in the absence of said frequency, and second signal means controlled by said detection means and operative when said frequency is modulated.

6. In combination with a telephone system having a plurality of substations connected by lines to a common switching point, individual sources of frequency coupled to said lines and energized thereover, means for modulating each individual frequency upon occurrence of a particular condition, detection means at said common switching point operative to detect the presence of said frequency and the presence of a modulation thereon, connecting means for selectively connecting said lines with said detection means, switching means controlled by said detection means and operative when said frequency is present, first signal means controlled by the operation of said switching means operative in the absence of said frequency, and second signal means controlled by said detection means and operative when said frequency is modulated.

7. In combination with a telephone system having a plurality of substations connected by lines to a common switching point, oscillator circuits coupled to said lines, energized thereover, and tuned to transmit a non-interfering frequency thereover, an infra-red sensitive device in each of said oscillator circuits responsive to the presence of a fire to modulate said non-interfering frequency, circuit means at said switching point for detecting the presence of modulation on said frequency, means at said switching point operable to selectively connect said circuit means to each of said lines, and alarm means operated when said circuit means detects modulation on a particular line on several successive connections thereto.

8. The combination of claim 7 wherein said circuit means comprises a first resonant circuit tuned for minimum impedance at said non-interfering frequency, a second resonant circuit tuned to pass the modulation components impressed upon said frequency by said infra-red sensitive device, a third resonant circuit tuned to pass said non-interfering frequency, and means for coupling said first with said second and said third resonant circuits.

9. In combination with a telephone system having a plurality of substations connected by lines to a common switching point, transistor oscillators coupled to said lines, energized thereover, and tuned to transmit a non-interfering frequency thereover, an infra-red sensitive device in the tuning circuit of each of said oscillators having the property of varying impedance when exposed to infra-red rays and thereby modulating said non-interfering frequency, a first tuned circuit at said switching point yielding minimum impedance at said non-interfering frequency, a second tuned circuit inductively coupled to said first tuned circuit and tuned to pass said non-interfering frequency, a third tuned circuit inductively coupled to said first tuned circuit to pass the modulation components impressed upon said frequency by said infra-red sensitive device, switching means at said switching point operable to selectively connect said first tuned circuit to each of said lines, a plurality of signal means individually representative of a particular infra-red sensitive device connectable by said switching means to said second tuned circuit and operable during the presence of said non-interfering frequency, a plurality of memory devices individually representative of a particular infra-red sensitive device connectable by switching means to said third tuned circuit and operable during the presence of said modulation components, and alarm means controlled by said memory devices to respond when any of said memory devices operate twice during successive connections of said first tuned circuit to a line.

10. In combination in a telephone system having a central station, a subscriber telephone station, a telephone line connecting said stations, a source of frequency at said subscriber station energized from said central station over said line, means at said subscriber station for modulating said frequency in response to a particular condition prevailing at said subscriber station, detection means at said central station selectively connectable to said line, signal means controlled by said detection means and operative in the absence of said frequency, and alarm means at said central station controlled by said detection means and operative when said frequency is modulated.

References Cited in the file of this patent

UNITED STATES PATENTS 2,690,477 Friedmann et al. -------- Sept. 28, 1954
2,696,524 Huntington -------------- Dec. 7, 1954